(12) United States Patent
Yu et al.

(10) Patent No.: US 8,717,508 B2
(45) Date of Patent: May 6, 2014

(54) LIQUID CRYSTAL DISPLAY DEVICE WITH INTERRED TOUCH SCREEN

(75) Inventors: Jae Sung Yu, Seoul (KR); Bu Yeol Lee, Goyang-si (KR); In Hyuk Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 13/222,388

(22) Filed: Aug. 31, 2011

(65) Prior Publication Data

US 2012/0086879 A1 Apr. 12, 2012

(30) Foreign Application Priority Data

Oct. 8, 2010 (KR) .......................... 10-2010-0098249

(51) Int. Cl.
*G02F 1/1335* (2006.01)
(52) U.S. Cl.
USPC ............................................ 349/12; 349/174
(58) Field of Classification Search
None
See application file for complete search history.

(56) References Cited

U.S. PATENT DOCUMENTS

| 5,631,666 A * | 5/1997 | Tagawa et al. ................. 345/104 |
| 2009/0058825 A1 | 3/2009 | Choi et al. |
| 2010/0066702 A1 | 3/2010 | Lee et al. |

FOREIGN PATENT DOCUMENTS

| KR | 10-2009-0022597 A | 3/2009 |
| KR | 10-2009-0028627 A | 3/2009 |
| KR | 10-2010-0031243 A | 3/2010 |
| WO | 2007/146780 A2 | 12/2007 |

OTHER PUBLICATIONS

KIPO: Korean Office Action for Korean Patent Application No. 10-2010-0098249—Issued on Oct. 25, 2012.

* cited by examiner

*Primary Examiner* — Thanh-Nhan P Nguyen
(74) *Attorney, Agent, or Firm* — Morgan, Lewis & Bockius LLP

(57) ABSTRACT

A Liquid Crystal Display (LCD) device includes a liquid crystal panel in which a plurality of common electrodes are formed; an interred touch sensor for applying a common voltage to the common electrodes, and detecting a touch point of the liquid crystal panel with a capacitance that is induced in the common electrodes; a plurality of common electrode lines for connecting the common electrodes to the touch sensor; and an equivalent potential unit formed in the common electrode lines, and discharging residual electric charges of the common electrodes.

18 Claims, 4 Drawing Sheets

LIQUID CRYSTAL DISPLAY DEVICE WITH INTERRED TOUCH SCREEN

This application claims the benefit of the Korean Patent Application No. 10-2010-0098249 filed in Korea on Oct. 8, 2010, which is hereby incorporated by reference as if fully set forth herein.

BACKGROUND OF THE INVENTION

1. Field of the Invention

The present invention relates to a liquid crystal display (LCD) device, and more particularly, an LCD device with a buried touch screen.

2. Background of the Related Art

With the advance of portable electronic devices such as mobile communication terminals and notebook computers, flat panel display (FPD) devices have been in great demand because the LCDs used in the FPD devices are easily manufactured and have easy drivers, high image quality and large screens.

An LCD device includes a lower substrate and an upper substrate, and a liquid crystal layer disposed between the lower and upper substrates. The LCD device controls transmittance of light that transmits through a plurality of pixel cells in the liquid crystal layer by applying a data voltage, to thereby display an image based on a video signal.

Recently, touch screens have become popular as substitutes for input devices such as mouse or keyboards because they allow users to directly input information by fingers and/or pens. The touch screens are also suitable for monitors such as navigation, industrial terminals, notebook computers, financial automation equipment and game machines, portable terminals such as portable phones, MPEG Audio layer 3 (MP3) players, personal digital assistants (PDAs), portable multimedia players (PMPs), play station portables (PSP), portable game machines and digital multimedia broadcasting (DMB) receivers, and home appliances such as refrigerators, microwave ovens and washing machines. The application of the touch screens are being expanded because they are easy to operate.

Recently, LCD devices with the buried touch screens have been developed to be slim. FIGS. 1 and 2 are views schematically illustrating a related art LCD device with an interred touch screen.

The related art LCD device, as illustrated in FIGS. 1 and 2, includes a lower substrate 50 and an upper substrate 60 that are coupled with a liquid crystal layer (not shown) therebetween. The related art LCD device controls light that transmits through a plurality of pixel cells in the liquid crystal layer according to a data voltage, and displays an image based on an video signal. When a user uses a finger or a pen to touch a screen on the upper substrate 60, the related art LCD device detects a touch point with the change of a capacitance Ctc.

The upper substrate 60 includes a black matrix 62 that defines a pixel region so as to be in correspondence with each of a plurality of pixel cells, a red color filter 64R that is formed in a pixel cell defined by the black matrix 62, a green color filter 64G that is formed in a pixel cell defined by the black matrix 62, a blue color filter 64B that is formed in a pixel cell defined by the black matrix 62, and an overcoat layer 66 that is formed to cover the black matrix 62 and the color filters 64R, 64G and 64B and planarizes the upper substrate 60. The lower substrate 50 includes a plurality of pixel cells for detecting the touch of the user's finger or the pen, and drives the liquid crystal layer.

As shown in FIG. 2, each of the pixel cells is defined by a data line 42 and a gate line 44 that intersect each other. The pixel cell is formed with a common electrode 46 to receive a common voltage and a pixel electrode 48 to supply a data voltage to the pixel cell. Herein, the common electrode 46 and the pixel electrode 48 are formed of a transparent conductive material such as indium tin oxide (ITO). Also, in the pixel cell, a thin film transistor TFT is switched with a gate signal that is applied through the gate line 44, and an electric field is formed with a data voltage that is applied to the data line 42 to thereby drive the liquid crystal layer.

At this point, the LCD device drives the common electrode 46 as a sensing line/driving line to detect a touch point of a user's finger or a pen, for a non-display duration. That is, a touch capacitance Ctc is formed between the upper substrate 60 and the common electrode 46 of each pixel cell according to the touch point. A touch sensor of the LCD device compares the touch capacitance Ctc based on the touch point with a reference capacitance, thereby detecting a touch point TS and outputting the detected touch point TS to the outside.

As described above, in the related art LCD device with the interred touch screen that uses a common electrode as a touch electrode, the common electrode is divided into an n number of horizontal common electrodes and an m number of vertical common electrodes for recognizing a touch coordinate. In this case, the common electrodes are required to be connected to each other in display, but be disconnected from each other in driving for touch recognition. An operation of connecting and disconnecting the common electrodes is performed in a Vcom multiplexer unit of a printed circuit board (PCB).

In the related art LCD device with the interred touch screen, since the common electrodes are disposed with different sizes and types, the common electrodes have different electric potentials when the panel is not driven. The common electrodes having different electric potentials input different amounts of mobile charges to respective pixel cells. This causes block dim where a partial region of the liquid crystal panel is seen darker than another region thereof when the LCD device is initially driven. The block dim due to the mobile charges is moderated with the elapse of time, but as described above, the block dim is clearly shown when the LCD device is initially driven, thus causing the deterioration of image quality.

SUMMARY OF THE INVENTION

Accordingly, the present invention is directed to an LCD device with an interred touch screen, in which resistors have some sides to be connected to the respective common electrode lines that connect common electrodes used as touch electrodes to a touch sensor, and the other sides of the respective resistors are connected to each other.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, an LCD device with an interred touch screen includes a liquid crystal panel; a plurality of common electrodes, configured in the liquid crystal panel; a touch sensor for applying a common voltage to the common electrodes, and detecting a touch point of the liquid crystal panel according to a capacitance that is induced in the common electrodes; a plurality of common electrode lines for connecting the common electrodes to the touch sensor; and an equivalent potential unit, electrically connected to the common electrode lines, and allow the common electrodes to have an equivalent potential.

The equivalent potential unit may include a plurality of common electrode resistors and a common potential line, wherein one side of each common electrode resistor may be connected to each common electrode line, respectively, and the other side of each common electrode resistor may be connected to the common potential line, respectively.

The common electrodes may include a plurality of horizontal common electrodes and a plurality of vertical common electrodes.

The touch sensor may supply the common voltage to the common electrodes for a display duration where the liquid crystal panel displays an image, and drive the common electrodes as sensing lines and driving lines for detecting of a touch point for a non-display duration where the liquid crystal panel does not display an image.

The equivalent potential unit may further include a plurality of connection resistors connected between the other sides of two adjacent common electrode resistors among the plurality of common electrode resistors.

In another embodiment of the present invention, an LCD device with an interred touch screen includes a liquid crystal panel; a plurality of common electrodes, configured in the liquid crystal panel; a touch sensor for applying a common voltage to the common electrodes, and detecting a touch point of the liquid crystal panel according to a capacitance that is induced in the common electrodes; a plurality of common electrode lines for connecting the common electrodes to the touch sensor; wherein each two adjacent common electrode lines are connected to each other via at least one common electrode resistor.

Each of the common electrode lines is respectively connected to a common potential line via the common electrode resistors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
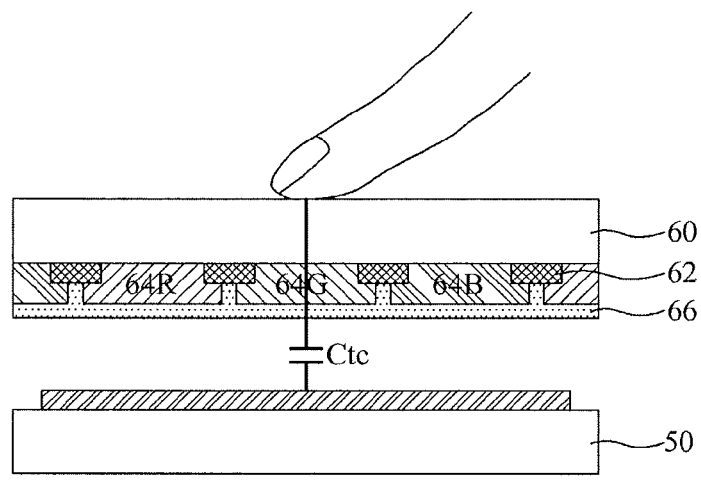
FIGS. 1 and 2 are views schematically illustrating a related art LCD device with an interred touch screen.
Figure 2:
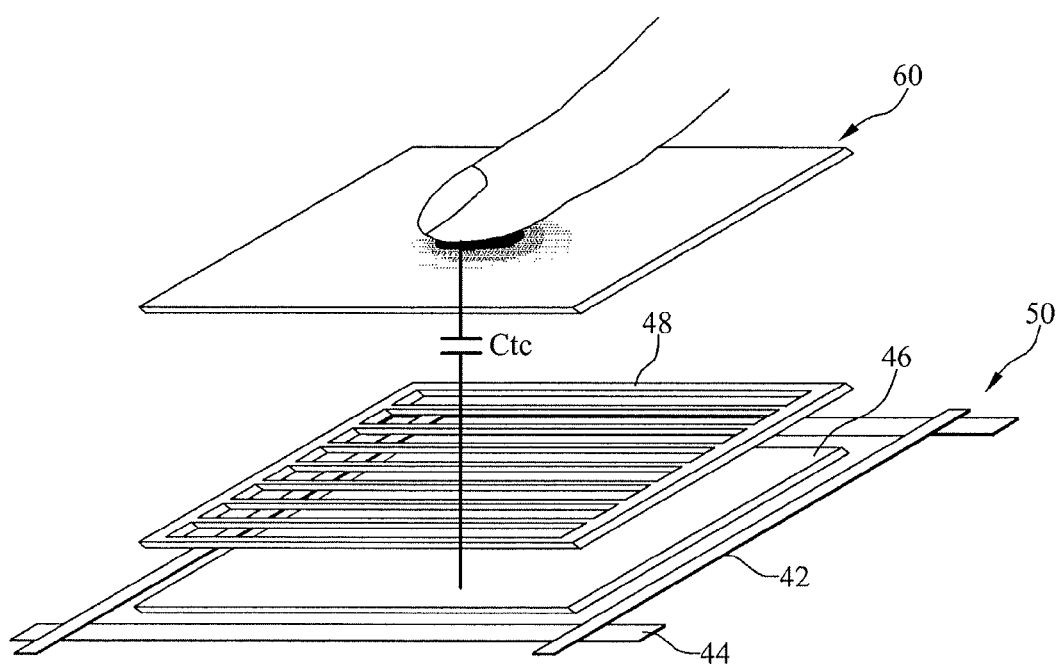

Reference will now be made in detail to the exemplary embodiments of the present invention, examples of which are illustrated in the accompanying drawings. Wherever possible, the same reference numerals will be used throughout the drawings to refer to the same or like parts.

Hereinafter, embodiments of the present invention will be described with reference to the accompanying drawings.

Figure 3:
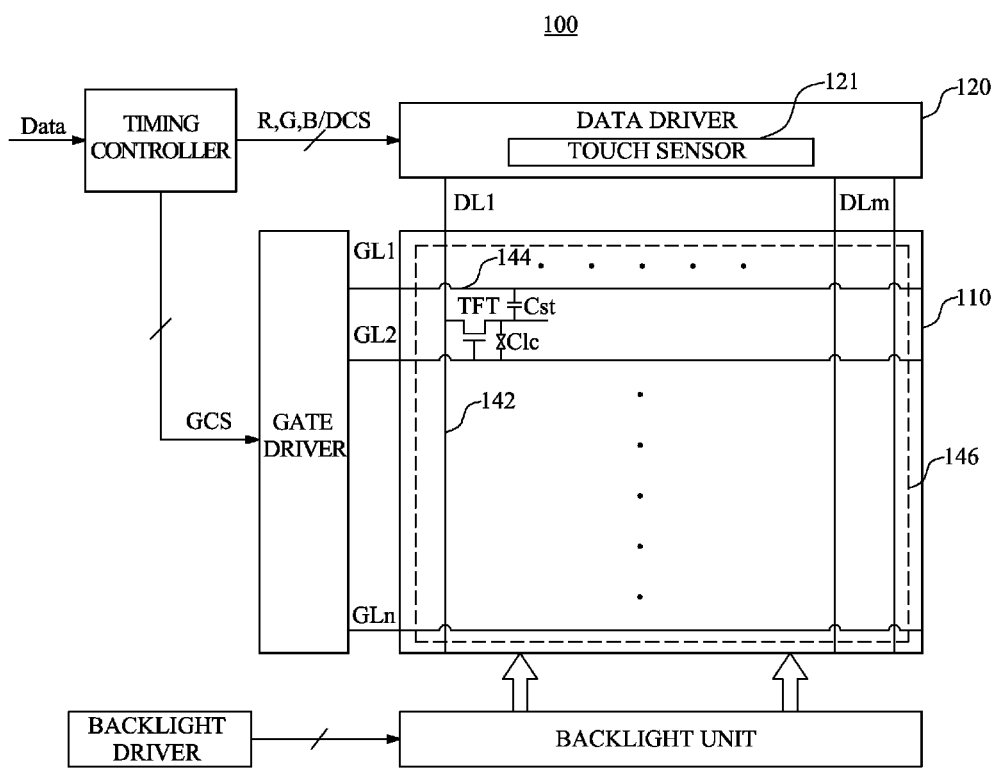
FIG. 3 is an exemplary view schematically illustrating an LCD device with an interred touch screen according to the present invention.
Figure 4:
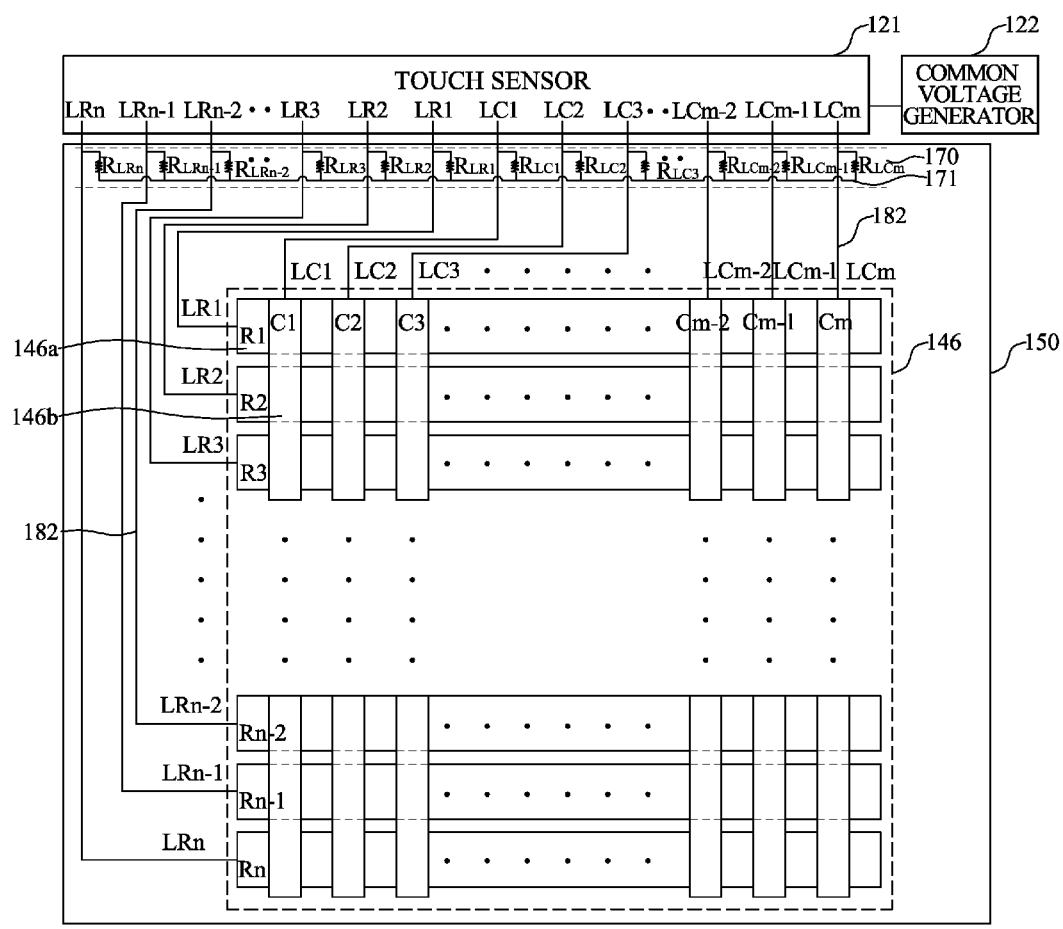
FIG. 4 is a plane view of a liquid crystal panel that is applied to an LCD device with an interred touch screen according to a first exemplary embodiment of the present invention.

FIG. 3 is an exemplary view schematically illustrating an LCD device with an interred touch screen according to the present invention. FIG. 4 is a plane view of a liquid crystal panel that is applied to an LCD device with an interred touch screen according to a first exemplary embodiment of the present invention.

As illustrated in FIG. 3, an LCD device 100 includes a liquid crystal display module and a driving circuit for driving the liquid crystal display module. The driving circuit includes a timing controller, a data driver 120, a common voltage generator 122 (of FIG. 4), a gate driver, a backlight driver, a power supply (not shown), and a touch sensor 121. Herein, the timing controller aligns an external video signal by a frame unit to generate digital image data RGB, and generates a driving control signal DCS of the data driver 120 and a driving control signal GCS of the gate driver. The data driver 120 supplies a data voltage based on the video signal to a liquid crystal panel 110. The common voltage generator 122 supplies a common voltage Vcom to a common electrode 146 of the liquid crystal panel 110. The gate driver supplies a scan signal to the liquid crystal panel 110. The backlight driver drives a backlight that irradiates light on the liquid crystal panel 110. The power supply supplies a driving power. The touch sensor 121 controls the supply of the common voltage Vcom to the liquid crystal panel 110, and recognizes a touch point on the basis of sensing information that is transferred from the common electrode 146 of the liquid crystal panel 110. Moreover, the common voltage generator 122 may be implemented as a separate element, or included in the data driver 120. Furthermore, the touch sensor 121 may also be implemented as a separate element, or included in the data driver 120. The present invention will be described below with reference to FIGS. 3 and 4 as an example that the touch sensor 121 is included in the data driver 120.

The liquid crystal display module includes the liquid crystal panel 110 that has an interred touch screen for detecting a touch point of a user or pen, and a backlight unit that irradiates light on the liquid crystal panel 110.

The liquid crystal panel 110 includes a lower substrate 150 (of FIG. 4) and an upper substrate (not shown) that are coupled with a liquid crystal layer (not shown) therebetween. In the liquid crystal panel 110, a plurality of pixel cells, which include a plurality of liquid crystal cells Clc, respectively, are arranged in a matrix type. The liquid crystal panel 110 controls transmittance of light so that the light transmits through a plurality of pixel cells in the liquid crystal layer according to a data voltage to thereby display an image based on the video signal. Also, the liquid crystal panel 110 senses the change of a capacitance caused by the touch from a user or a pen, and transfers a sensed result to thereby detecting a touch point TS.

The upper substrate includes a black matrix that defines a pixel region so as to be in correspondence with each of a plurality of pixel cells, a red color filter that is formed in a pixel cell defined by the black matrix, a green color filter that is formed in a pixel cell defined by the black matrix, a blue color filter that is formed in a pixel cell defined by the black matrix, and an overcoat layer that is formed to cover the black matrix and the color filters and planarizes the upper substrate.

The lower substrate 150 includes a plurality of pixel cells that are formed in respective regions. There regions are defined by intersection between an n number of gate lines (GL1 to GLn) 144 and an m number of data lines (DL1 to DLm) 142. Also, on the lower substrate 150, a common electrode 146 is configured with a plurality of horizontal common electrodes (R1 to Rn) 146a and a plurality of vertical common electrodes (C1 to Cm) 146b and supplies a common voltage to the pixel cells. Also, a plurality of common electrode lines 182 connect the horizontal common electrodes 146a and the vertical common electrodes 146b to the touch sensor 121, respectively. An equivalent potential unit 170 is formed in the common electrode lines 182 and allows the horizontal common electrodes 146a and the vertical common electrodes 146b to maintain the same electric potential when the liquid crystal panel 110 is not driven. Herein, as illustrated in FIG. 4, reference numerals R1 to Rn are respectively given to the horizontal common electrodes 146a sequentially from the common electrode of the uppermost portion of the liquid crystal panel 110, and reference numerals C1 to Cm are respectively given to the vertical common electrodes 146b sequentially from the common electrode of the leftmost portion of the liquid crystal panel 110.

Each of the pixel cells includes a thin film transistor TFT and a storage capacitor Cst that are formed at an intersection portion between a gate line 144 and a data line 142. The thin film transistor TFT supplies a data voltage, which is applied through the data line 142, to the liquid crystal cell Clc in response to a scan signal that is applied through the gate line 144.

Each pixel cell is defined by the data line 142 and the gate line 144 that are intersected. The thin film transistor TFT is switched with the scan signal (i.e., a gate signal) that is applied through the gate line 144, thereby turning the each pixel cell on. In a turned-on pixel cell, an electric field is formed with a data voltage that is applied through the data line 142 and drives the liquid crystal layer.

For this, a pixel electrode (not shown, a pixel ITO) is formed in each pixel cell and supplies a data voltage based on the video signal to the each pixel cell. The common electrode 146 is also formed in each pixel cell and receives the common voltage Vcom. Herein, the common electrode 146 and the pixel electrode may be formed of a transparent conductive material such as ITO, and the common electrode 146 may be disposed over/under the pixel electrode.

Herein, the common electrode 146 serves as an electrode to supply the common voltage Vcom for a display duration when an image is displayed. On the other hand, the common electrode 146 serves as a sensing line/driving line to detect a touch point by a user or a pen for a non-display duration when an image is not displayed. In other words, the common electrode 146 serves as the electrode that applies the common voltage Vcom for displaying an image and also as the sensing line/driving line for detecting the touch point. For this, the common electrode 146 may be configured with the horizontal common electrodes R1 to Rn and the vertical common electrodes C1 to Cm.

As illustrated in FIG. 4, the common electrode line 182 connects the horizontal common electrodes R1 to Rn and the vertical common electrodes C1 to Cm to the touch sensor 121, and is formed along a non-display region of the lower substrate 150. Accordingly, the number of common electrode lines may be the same as the number of horizontal common electrodes and vertical common electrodes. However, the common electrode line may be formed by grouping the horizontal common electrodes or the vertical common electrode, and thus the number of common electrode lines connected to the touch sensor 121 may be the same as or less than the number of horizontal common electrodes and vertical common electrodes.

The equivalent potential unit 170 allows the horizontal common electrodes 146a and the vertical common electrodes 146b to maintain the same electric potential when the liquid crystal panel 110 is not driven. For this, the respective common electrode lines 182 are connected to a plurality of common electrode resistors having a resistance value of about 2 M$\Omega$ to about 900 M$\Omega$, respectively. Among the common electrode lines 182, each two adjacent common electrode lines 182 are connected to each other via at least one resistor. The common lines 182 are respectively connected to the common potential line 171 via the resistors ($R_{LC1} \ldots R_{LCm}$, and $R_{LR1} \ldots R_{LRn}$).

As illustrated in FIG. 4, one side of an nth horizontal common electrode resistor $R_{LRn}$ is connected to an nth horizontal common electrode line LRn that connects the nth horizontal common electrode Rn and the touch sensor 121. One side of an (n−1)th horizontal common electrode resistor $R_{LRn-1}$ is connected to one side of an (n−1)th horizontal common electrode line LRn−1 that connects the (n−1)th horizontal common electrode Rn−1 and the touch sensor 121, and another side of the nth horizontal common electrode resistor $R_{LRn}$ is connected to another side of the (n−1)th horizontal common electrode resistor $R_{LRn-1}$.

Likewise, one side of an (n−2)th horizontal common electrode resistor $R_{LRn-2}$ is connected to one side of an (n−2)th horizontal common electrode line LRn−2 that connects the (n−2)th horizontal common electrode Rn−2 and the touch sensor 121, and another side of the (n−1)th horizontal common electrode resistor $R_{LRn-1}$ is connected to another side of the (n−2)th horizontal common electrode resistor $R_{LRn-2}$.

In this way, one side of a second horizontal common electrode resistor $R_{LR2}$ is connected to a second horizontal common electrode line LR2 that connects the second horizontal common electrode R2 and the touch sensor 121, and another side of the second horizontal common electrode resistor $R_{LR2}$ is connected to another side of a third horizontal common electrode resistor $R_{LR3}$ and another side of a first horizontal common electrode resistor $R_{LR1}$.

One side of a first vertical common electrode resistor $R_{LC1}$ is connected to a first vertical common electrode line LC1 that connects a first vertical common electrode C1 and the touch sensor 121, and the other side of the first horizontal common electrode resistor $R_{LR1}$ is connected to another side of the first vertical common electrode resistor $R_{LC1}$. Some sides of second to mth vertical common electrode resistors $R_{LC2}$ to $R_{LCm}$ are respectively connected to second to mth vertical common electrodes C2 to Cm, and the other sides of the second to mth vertical common electrode resistors RLC2 to $R_{LCm}$ are connected in the above-described way.

Sides of nth to 1st horizontal common electrode resistors $R_{LRn}$ to $R_{LR1}$ and 1st to mth vertical common electrode resistors $R_{LC1}$ to $R_{LCm}$ are connected to nth to 1st horizontal common electrode lines LRn to LR1 and 1st to mth vertical common electrode lines LC1 to LCm, respectively. Other sides of the resistors are sequentially connected to a common potential line 171.

Therefore, the other side of the (n−1)th horizontal common electrode resistor $R_{LRn-1}$ is connected to the other side of the nth horizontal common electrode resistor $R_{LRn}$ and the other side of the (n−2)th horizontal common electrode resistor $R_{LRn-2}$. The other side of the first horizontal common electrode resistor $R_{LR1}$ is connected to the other side of the second horizontal common electrode resistor $R_{LR2}$ and the other side of the first vertical common electrode resistor $R_{LC1}$. The other side of the (m−1)th vertical common electrode resistor $R_{LCm-1}$ is connected to the other side of the mth vertical common electrode resistor $R_{LCm}$ and the other side of the (m−2)th vertical common electrode resistor $R_{LCm-2}$.

That is, some sides of the common electrode resistors are respectively connected to the horizontal common electrode lines and the vertical common electrode lines, and the equivalent potential unit 170 applied to the first exemplary embodiment is connected to the other sides of the common electrode resistors.

To allow the common electrodes to have an equivalent potential, a resistance value may be low. However, the amount of electric charge that leads to a potential difference between the respective common electrodes is limited, and particularly, a resistor is required to have a value of a certain range so as not to affect touch driving. Therefore, resistance values of the common electrode resistors $R_{LRn}$ to $R_{LR1}$ and $R_{LC1}$ to $R_{LCm}$ may be 2 MΩ to 900 MΩ.

The higher the resistance value of the common electrode resistor is, the better the touch characteristic becomes. However, if the resistance value is too high, the residual electric charge of the common electrode may not be discharged through the common electrode resistor, and thus discharge characteristic deteriorates. Therefore, the common electrode resistor may have a resistance value equal to the degree where an electric charge is discharged faster than a speed at which the residual direct current (DC) electric charge of the common electrode is generated. In this viewpoint, the common electrode resistor may have a resistance value of about 2 MΩ to about hundreds MΩ. Moreover, the equivalent potential unit 170 may be formed in the liquid crystal panel 110, but it is not limited thereto. The equivalent potential unit 170 may be formed in the data driver 120 or the touch sensor 121.

In the LCD device with the interred touch screen according to the first exemplary embodiment as described above, the common electrode 146 of the lower substrate 150 serves as the electrode to supply the common voltage Vcom and also serves as the sensing line/driving line to detect a touch point by a user or a pen.

The following description will be made on a driving method of the LCD device with the interred touch screen according to the first exemplary embodiment as described above.

First, the common voltage Vcom for realizing an image is supplied through the common electrode 146 that are configured with the horizontal common electrodes and the vertical common electrodes, for a display duration (for example, a ½ frame duration) during which the liquid crystal panel displays an image. That is, the common voltage Vcom for realizing an image is applied via many paths through the common electrode 146 that are configured with the horizontal common electrodes and the vertical common electrodes, for the display duration when the liquid crystal panel displays an image.

The common electrode 146 serves as the sensing line/driving line to detect the touch point, for a non-display duration (for example, a ½ frame duration) during which the liquid crystal panel does not display an image. That is, one of the horizontal common electrode and the vertical common electrode is driven as the driving line, and the other is driven as the sensing line.

At this point, the touch sensor 121 determines the touched X and Y coordinates of the liquid crystal panel 110 based on the change in a capacitance that is sensed through the horizontal common electrode and the vertical common electrode, thereby sensing the touch point. The touch sensor 121 detects the touch point with a touch capacitance that is formed between the upper substrate and the common electrode 146 that serves as the sensing line/driving line.

When a user touches a specific point of a screen on the upper substrate by a finger or a pen, a touch capacitance that is formed between the upper substrate and the common electrode 146 is changed. For example, the touch sensor 121 uses the common electrode 146 formed in a pixel cell as the sensing line/driving line at every non-display duration (for example, blanking section) of each pixel cell by a frame unit, to detect a touch point TS based on the change in a touch capacitance caused by a user's touch and output the detected touch point to the outside. Therefore, the common electrode 146 formed in the lower substrate 150 serves as the electrode to supply the common voltage Vcom as well as the sensing line/driving line to detect a user's touch point.

Since the vertical common electrodes and the horizontal common electrodes are formed with different sizes and types in the liquid crystal panel 110, the vertical common electrodes and the horizontal common electrodes have different amounts of electric potentials when the display duration and the non-display duration are repeated, and then driving of the liquid crystal panel 110 is stopped, i.e., when a power source is disconnected and the output of an image is stopped through the liquid crystal panel 110. Such potential difference forms different mobile charges in the respective pixel cells.

At this point, the present invention discharges different electric charges formed in the horizontal common electrode and the vertical common electrodes through the equivalent potential unit 170 and the common electrode resistors formed in the common electrode lines, respectively, thereby disallowing the mobile charge to be formed in the each pixel.

When the liquid crystal panel 110 is driven and then a power source is disconnected, the residual DC charges of the common electrodes are discharged through the common electrode resistors $R_{LRn}$ to $R_{LR1}$ and $R_{LC1}$ to $R_{LCm}$, and thus the common electrodes have the same electric potential. Accordingly, even at an initial stage where the liquid crystal panel 110 is again driven subsequently, a block dim cannot occur by the common electrodes having different electric potentials.

Figure 5:
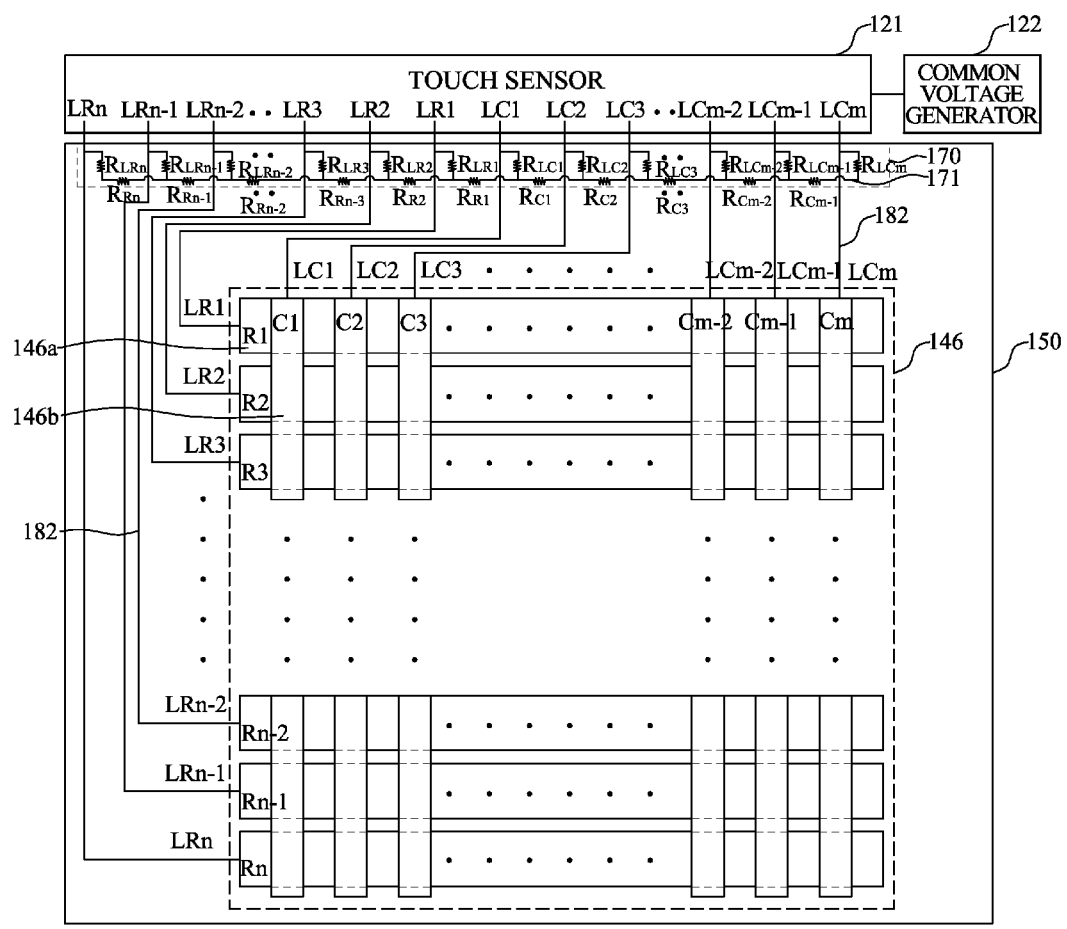
FIG. 5 is a plane view of a liquid crystal panel that is applied to an LCD device with an interred touch screen according to a second exemplary embodiment of the present invention.

FIG. 5 is a plane view of a liquid crystal panel that is applied to an LCD device with an interred touch screen according to a second exemplary embodiment of the present invention.

Except for the equivalent potential unit 170, the LCD device with the interred touch screen according to the second embodiment of the present invention has the same structures and functions as those of the LCD device with the interred touch screen according to the first exemplary embodiment of the present invention, and thus only a structure and function of the equivalent potential unit 170 will be described below.

Among the common electrode lines 182, each two adjacent common electrode lines 182 are connected to each other via at least one resistor. Each of the common lines 182 is connected to a corresponding one of the common potential line 171 using the resistors ($R_{LC1} \ldots R_{LCm}$, $R_{LR1} \ldots R_{LRn}$, $R_{C1} \ldots R_{Cm}$ and $R_{R1} \ldots R_{Rn}$).

The equivalent potential unit 170 of the second exemplary embodiment allows the horizontal common electrodes and the vertical common electrodes to maintain the same electric potential when the liquid crystal panel 110 is not driven. As illustrated in FIG. 5, one side of an nth horizontal common electrode resistor $R_{LRn}$ is connected to an nth horizontal common electrode line LRn that connects an nth horizontal common electrode Rn and the touch sensor 121. Another side of the nth horizontal common electrode resistor $R_{LRn}$ is connected to one side of an nth horizontal connection resistor $R_{Rn}$. One side of an (n–1)th horizontal common electrode resistor $R_{LRn-1}$ is connected to one side of an (n–1)th horizontal common electrode line LRn–1 that connects the (n–1)th horizontal common electrode Rn–1 and the touch sensor 121, and another side of the nth horizontal connection resistor $R_{Rn}$ is connected to another side of the (n–1)th horizontal common electrode resistor $R_{LRn-1}$.

Likewise, another side of the (n–1)th horizontal common electrode resistor $R_{LRn-1}$ is connected to one side of an (n–1)th horizontal connection resistor $R_{Rn-1}$. One side of an (n–2)th horizontal common electrode resistor $R_{LRn-2}$ is connected to one side of an (n–2)th horizontal common electrode line LRn–2 that connects the (n–2)th horizontal common electrode Rn–2 and the touch sensor 121, and another side of the (n–1)th horizontal connection resistor $R_{Rn-1}$ is connected to another side of the (n–2)th horizontal common electrode resistor $R_{LRn-1}$.

In this way, one side of a second horizontal common electrode resistor $R_{LR2}$ is connected to a second horizontal common electrode line LR2 that connects the second horizontal common electrode R2 and the touch sensor 121, and another side of the second horizontal common electrode resistor $R_{LR2}$ is connected to another side of a third horizontal connection resistor $R_{R3}$ and another side of a second horizontal connection resistor $R_{R2}$.

The other side of the first horizontal common electrode resistor $R_{LR1}$ is again connected to the one side of the first horizontal connection resistor $R_{R1}$. The one side of the first vertical common electrode resistor $R_{LC1}$ is connected to the first vertical common electrode line LC1 that connects the first vertical common electrode C1 and the touch sensor 121, and the other side of the first horizontal connection resistor $R_{R1}$ is connected to the other side of the first vertical common electrode resistor $R_{LC1}$. The sides of the second to mth vertical common electrode resistors $R_{LC2}$ to $R_{LCm}$ are respectively connected to the second to mth vertical common electrodes C2 to Cm, and the other sides of the second to mth vertical common electrode resistors $R_{LC2}$ to $R_{LCm}$ are connected in the above-described way. However, the other side of the mth vertical common electrode resistor $R_{LCm}$ connected to the mth vertical common electrode line LCm is connected to the other side of the (m–1)th vertical connection resistor $R_{Cm-1}$.

The sides of the nth to first horizontal common electrode resistors $R_{LRn}$ to $R_{LR1}$ and first to mth vertical common electrode resistors $R_{LC1}$ to $R_{LCm}$ are connected to the nth to first horizontal common electrode lines LRn to LR1 and the first to mth vertical common electrode lines LC1 to LCm, respectively. Other sides of the resistors are sequentially connected to the common potential line 171.

In the equivalent potential unit 170 of the second exemplary embodiment, sides of the common electrode resistors $R_{LRn}$ to $R_{LR1}$ and $R_{LC1}$ to $R_{LCm}$ are connected to the horizontal common electrode lines and the vertical common electrode lines, respectively, and other sides of the respective common electrode resistors $R_{LRn}$ to $R_{LR1}$ and $R_{LC1}$ to $R_{LCm}$ are sequentially connected by the connection resistors $R_{Rn}$ to $R_{R1}$ and $R_{C1}$ to $R_{Cm-1}$.

In this case, a resistance value of each of the connection resistors may be the same as a resistance value of each of the common electrodes. According to the second exemplary embodiment, when the other sides of the common electrode resistors are connected through the connection resistors, a relatively higher resistance value can be obtained even with a smaller area, and thus touch and discharge characteristics can be maximized.

The present invention connects some sides of the resistors to the common electrode lines that connect the common electrodes used even as the touch electrodes to the touch sensor, respectively, and connect the other sides of the respective resistors to each other. Accordingly, the present invention removes a residual DC difference caused by a potential difference between the sensing line and the driving line that are used as the touch electrode, thereby removing the block dim that occurs when the liquid crystal panel is initially driven.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Liquid Crystal Display (LCD) device comprising:
   a liquid crystal panel;
   a plurality of common electrodes configured in the liquid crystal panel;
   an interred touch sensor for applying a common voltage to the common electrodes, and detecting a touch point of the liquid crystal panel according to a capacitance that is induced in the common electrodes;
   a plurality of common electrode lines for connecting the common electrodes to the touch sensor; and
   an equivalent potential unit, electrically connected to the common electrode lines, and allowing the common electrodes to have an equivalent potential,
   wherein the common electrodes comprise a plurality of horizontal common electrodes and a plurality of vertical common electrodes.

2. The LCD device according to claim 1, wherein:
   the equivalent potential unit includes a plurality of common electrode resistors and a common potential line,
   each of the common electrode resistors has a first side that is connected to a corresponding one of the common electrode lines, and has a second side that is connected to a common potential line.

3. The LCD device according to claim 2, wherein a resistance value of each of the common electrode resistors is 2 MΩ to 900 MΩ.

4. The LCD device according to claim 2, wherein the common potential line comprises a plurality of connection resistors, each connection resistor is connected between two adjacent common electrode resistors.

5. The LCD device according to claim 4, wherein a resistance value of each of the connection resistors is the same as a resistance value of each of the common electrode resistors.

6. The LCD device according to claim 1, wherein the horizontal common electrodes and the vertical common electrodes are perpendicular to each other.

7. The LCD device according to claim 1, wherein:
   the touch sensor supplies the common voltage to the common electrodes, for a display duration where the liquid crystal panel displays an image, and
   the touch sensor drives the common electrodes as sensing lines and driving lines for detecting of a touch point, for a non-display duration where the liquid crystal panel does not display an image.

8. The LCD device according to claim 1, wherein the equivalent potential unit allows the common electrodes to have an equivalent potential when a power source is disconnected and/or driving of the liquid crystal panel is stopped.

9. The LCD device according to claim 1, wherein:
the equivalent potential unit is formed in the liquid crystal panel, the equivalent potential unit is formed in a data driver for supplying a data signal to the liquid crystal panel, or
the equivalent potential unit is formed in the touch sensor.

10. A Liquid Crystal Display (LCD) device comprising:
a liquid crystal panel;
a plurality of common electrodes configured in the liquid crystal panel;
an interred touch sensor for applying a common voltage to the common electrodes, and detecting a touch point of the liquid crystal panel according to a capacitance that is induced in the common electrodes; and
a plurality of common electrode lines for connecting the common electrodes to the touch sensor;
wherein each two adjacent common electrode lines are connected to each other via at least one common electrode resistor, and
the common electrodes comprise a plurality of horizontal common electrodes and a plurality of vertical common electrodes.

11. The LCD device according to claim 10, wherein each of the common electrode lines is respectively connected to a common potential line via the common electrode resistors.

12. The LCD device according to claim 11, wherein a resistance value of each of the common electrode resistors is 2 MΩ to 900 MΩ.

13. The LCD device according to claim 11, wherein the common potential line comprises a plurality of connection resistors, each connection resistor is connected between two adjacent common electrode resistors.

14. The LCD device according to claim 13, wherein a resistance value of each of the connection resistors is the same as a resistance value of each of the common electrode resistors.

15. The LCD device according to claim 10, wherein the horizontal common electrodes and the vertical common electrodes are perpendicular to each other.

16. The LCD device according to claim 10, wherein:
the touch sensor supplies the common voltage to the common electrodes, for a display duration where the liquid crystal panel displays an image, and
the touch sensor drives the common electrodes as sensing lines and driving lines for detecting of a touch point, for a non-display duration where the liquid crystal panel does not display an image.

17. The LCD device according to claim 10, wherein the equivalent potential unit allow the common electrodes to have an equivalent potential when a power source is disconnected and/or driving of the liquid crystal panel is stopped.

18. The LCD device according to claim 10, wherein:
the equivalent potential unit is formed in the liquid crystal panel,
the equivalent potential unit is formed in a data driver for supplying a data signal to the liquid crystal panel, or
the equivalent potential unit is formed in the touch sensor.

* * * * *